(12) United States Patent
Beck et al.

(10) Patent No.: US 7,149,611 B2
(45) Date of Patent: Dec. 12, 2006

(54) VIRTUAL SENSOR MAST

(75) Inventors: Michael S. Beck, Colleyville, TX (US); Wendell H. Chun, Littleton, CO (US); Jon T. Stinchcomb, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 161 days.

(21) Appl. No.: 10/639,267

(22) Filed: Aug. 12, 2003

(65) Prior Publication Data

US 2004/0167682 A1    Aug. 26, 2004

Related U.S. Application Data

(60) Provisional application No. 60/449,271, filed on Feb. 21, 2003.

(51) Int. Cl.
*G01M 17/00* (2006.01)
(52) U.S. Cl. .............................. 701/29; 701/11; 701/15; 244/3.15; 244/171
(58) Field of Classification Search .................. 701/23, 701/3, 11, 15–16, 29; 244/3.1, 3.11, 3.12, 244/3.15, 3.2, 12.2–12.3, 17.11, 17.13, 17.14, 244/17.15, 32, 171
See application file for complete search history.

(56) References Cited

U.S. PATENT DOCUMENTS 3,880,103 A * 4/1975 Talkington .................. 405/185
4,757,962 A * 7/1988 Grant ......................... 244/12.3
4,860,968 A * 8/1989 Pinson ....................... 244/3.12
5,170,963 A * 12/1992 Beck, Jr. .................... 244/12.2
5,186,414 A * 2/1993 Holzschuh et al. ........ 244/3.12
5,310,134 A * 5/1994 Hsu et al. .................. 244/3.12
6,270,038 B1 * 8/2001 Cycon et al. .............. 244/12.3
6,397,063 B1 * 5/2002 Sessions et al. ............ 455/425
6,813,218 B1 * 11/2004 Antonelli et al. ............... 367/3
2002/0109045 A1 * 8/2002 Beach et al. .................. 244/33

\* cited by examiner

*Primary Examiner*—Gertrude A. Jeanglaude
(74) *Attorney, Agent, or Firm*—Williams, Morgan & Amerson (57) ABSTRACT

A virtual sensor mast for a ground vehicle and a method for operating a ground vehicle using a virtual sensor mast are disclosed. The virtual sensor mast includes an unmanned airborne vehicle capable of lifting itself from the ground vehicle upon deployment therefrom; a sensor suite mounted to the unmanned airborne vehicle; and a tether between the unmanned airborne vehicle and the ground vehicle over which the sensor suite is capable of communicating sensed data upon deployment. The method includes elevating a tethered unmanned airborne vehicle from the ground vehicle to a predetermined height; sensing environmental conditions surrounding the ground vehicle; and terminating the deployment.

48 Claims, 9 Drawing Sheets

VIRTUAL SENSOR MAST

We claim the earlier effective filing date of co-pending U.S. Provisional Application Ser. No. 60/449,271, entitled "Unmanned Ground Vehicle," filed Feb. 21, 2003, in the name of Michael S. Beck, et al., for all common subject matter.

BACKGROUND OF THE INVENTION

1. Field of the Invention

This invention pertains to remote sensing for ground vehicles and, more particularly, to a technique for achieving a higher vantage point from which the sensing occurs.

2. Description of the Related Art

One significant challenge presented by unmanned, robotic vehicles is situational awareness. Situational awareness includes detection and identification of conditions in the surrounding environment. Robotic vehicles typically carry a variety of instruments to remotely sense the surrounding environment. Commonly used instruments include technologies such as:

- acoustic;
- infrared, such as short wave infrared ("SWIR"), long wavelength infrared ("LWIR"), and forward looking infrared ("FLIR");
- optical, such as laser detection and ranging ("LADAR").

Typically, several different instruments are used to employ more than one of these technologies since each has advantages and disadvantages relative to the others.

A common limitation for any of these technologies is the vantage point of the instrument. For instance, the height of the vantage point inherently limits the field of view for any sensor, which is particularly problematical for long-range sensors. The height of the vantage point also affects the perspective of the data collected. For instance, the perspective afforded by a higher vantage point facilitates identifying negative obstacles (e.g., ditches) and cul-de-sacs.

One approach to this problem is to mount at least some of the sensors relatively high on the body of the vehicle. Sensors for which this limitation is particularly problematical are sometimes mounted to a mast extending upwardly from the vehicle. However, simply positioning the sensors high on the vehicle's body or on a sensor mast may offer only marginal improvement. Mounting sensors atop a mast may complicate maneuverability for the vehicle and or have other adverse consequences, such as increasing the vehicle's profile.

Another approach places the sensors on an airborne vehicle that communicates wirelessly with the ground vehicle. The airborne vehicle may be, for instance, a teleoperated or robotic helicopter that senses the environment and wirelessly transfers the data to the ground vehicle. This approach can greatly enlarge the field of view, since the altitude of the airborne vehicle is independent of the ground vehicle. However, this approach also manifests several drawbacks. For instance, because the airborne vehicle is independent of the ground vehicle, it must provide its own power, which adds size, weight, and complexity to the airborne vehicle. Also, since the airborne vehicle communicates wirelessly, precautions must be taken when several are used contemporaneously in the same general area. The independence of the airborne and ground vehicles also introduces uncertainties in the data caused by uncertainties in the relative positions of the vehicles.

The present invention is directed to resolving, or at least reducing, one or all of the problems mentioned above.

SUMMARY OF THE INVENTION

The invention includes a virtual sensor mast for a ground vehicle and a method for operating a ground vehicle using a virtual sensor mast. The virtual sensor mast comprises an unmanned airborne vehicle capable of lifting itself from the ground vehicle upon deployment therefrom; a sensor suite mounted to the unmanned airborne vehicle; and a tether between the unmanned airborne vehicle and the ground vehicle over which the sensor suite is capable of communicating sensed data upon deployment. The method comprises elevating a tethered unmanned airborne vehicle from the ground vehicle to a predetermined height; sensing environmental conditions surrounding the ground vehicle; and terminating the deployment.

BRIEF DESCRIPTION OF THE DRAWINGS

The invention may be understood by reference to the following description taken in conjunction with the accompanying drawings, in which like reference numerals identify like elements, and in which:

FIG. 5A–FIG. 5H illustrate one particular embodiment of a ducted fan with which the unmanned airborne vehicle may be implemented in one particular embodiment, wherein:

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers'specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
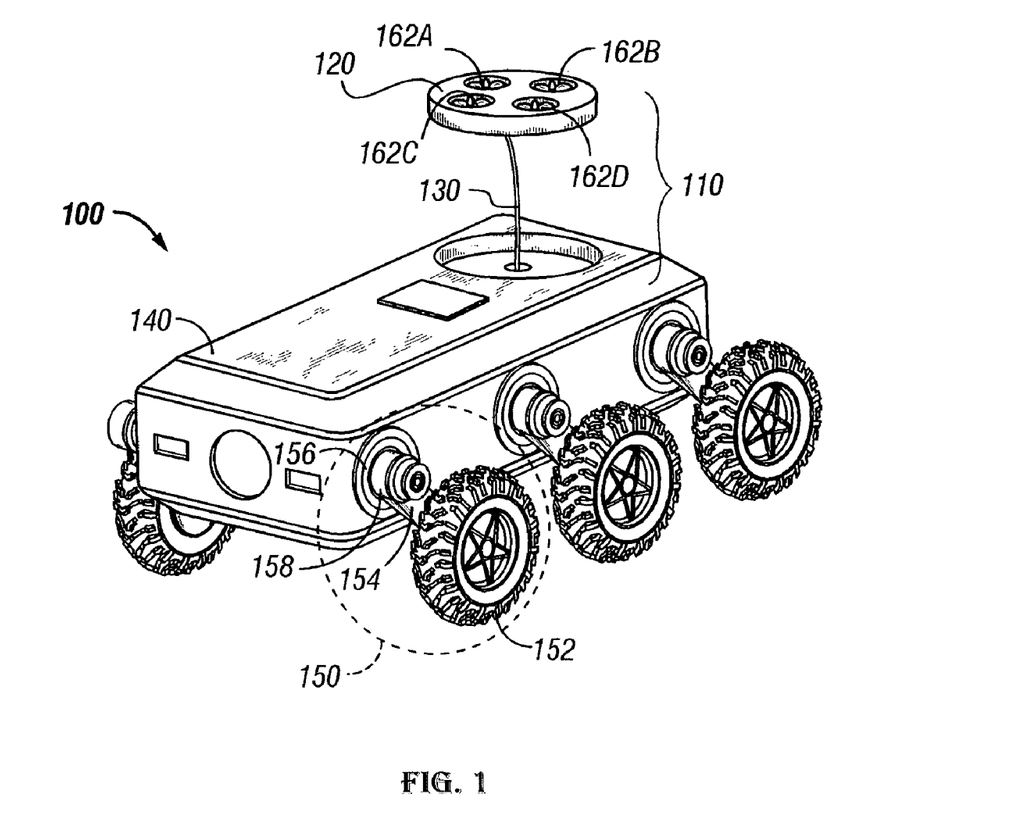
FIG. 1 depicts a ground vehicle employing a virtual sensor mast in accordance with the present invention.
Figure 2:
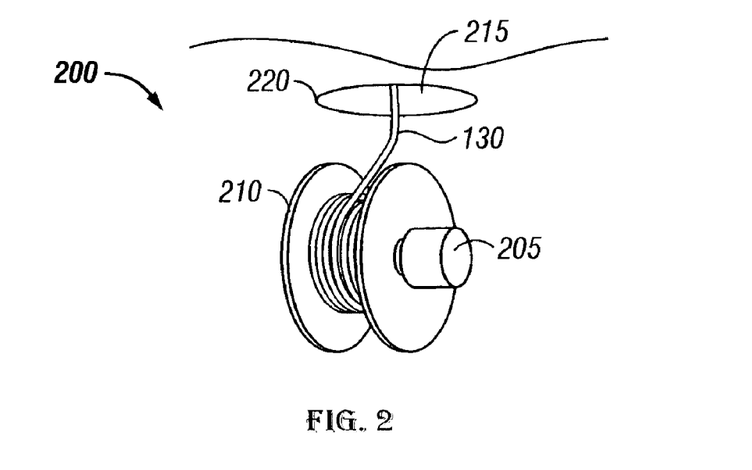
FIG. 2 depicts a portion of a tether management system such as may be employed in the embodiment of FIG. 1.

FIG. 1 illustrates an unmanned ground vehicle ("UGV") 100 employing a virtual sensor mast 110 in accordance with the present invention. The virtual sensor mast 110 comprises an unmanned airborne vehicle ("UAV") 120 communicating with the ground vehicle over a tether 130. The UAV 120 includes a suite of sensors (not shown) discussed more fully below. The UAV 120 is shown deployed, i.e., elevated from the ground vehicle 100, and may be stowed in a fashion discussed more fully below. The UAV 120 is a vertical takeoff and landing ("VTOL") vehicle, and is electrically powered over the tether 130 in the illustrated embodiment. A tether management system 200, partially shown in FIG. 2, is housed in the chassis 140 of the UGV 100 and manages the tether 130 as the UAV 120 is deployed and retrieved in a manner described more fully below. The tether management system 200 includes an electric motor and winch 205 and a drum 210 used to control the tension/spooling of the tether 130. Variable stops can be achieved through freezing the drum 210 at the desired locations using sensory feedback (drum encoder, string potentiometer or infrared/ultrasonic sensor, none shown). Note that some embodiments may employ rollers or bearings around the lip 215 of the opening 220 through which the tether 130 is deployed and retracted.

Referring again to FIG. 1,the UGV 100, in the illustrated embodiment, is a six-wheeled vehicle including six wheel assemblies 150 (only one indicated) that comprise a suspension system for the UGV 100. Each wheel assembly 150 includes an airless wheel 152 fabricated from a composite material and mounted to an independently articulated suspension arm 154. Note that alternative embodiments may employ a commercial-off-the-shelf ("COTS"), all terrain vehicle ("ATV") tire, e.g., the Dunlop KT401C. The articulated suspension arms 154 are capable of rotation facilitating extreme mobility and obstacle negotiation as well as inverted operability. A rotary magnetorheological ("MR") damper 156, facilitated by substantially real time damping control, is mounted coaxially with the arm pivot 158. Each suspension arm 154 has a compliant rotary suspension with controllable damper 156 to absorb impacts and provide for sensor stability. Air springs (not shown) and double wishbone suspension (also not shown) at each wheel 152 provide a lightweight, robust and fail-soft suspension.

Each suspension arm 154 has a high torque rotation actuator (not shown) that enables the UGV 100 to perform maneuvers not ordinarily possible in manned vehicles. The wheel assemblies 150 enable the UGV 100 to:

"walk" over large obstacles;

vary height/ground clearance;

adapt steering and suspension dynamics on the fly; and safely accommodate high impact velocities.

Individual articulation of the wheel assemblies 150 further enhances skid steering through footprint variation. Survivability and stability are enhanced by squatting the UGV 100 to reduce presented area and lower center of gravity ("CG"), enhance mobility in soft terrain and improve sensor visibility via front elevation.

Each wheel 152 includes a two-speed transmission (not shown) embedded in the hub to allow for high and low speed operation with hub drive motors (not shown). Each suspension arm 154 is driven by an independent, dedicated drive. The assembly of wheel, drive motor, switching hub, etc., eliminates (or at least reduces) the need for mechanical brakes. Each wheel 120 contains a hub drive motor (not shown) and integrated gear set (not shown) that allow wheel-to-wheel speed variations and enhanced skid steering. Each articulated suspension arm 125 houses a hub motor controller (not shown). This improves reliability through the reduction of slip rings (not shown) required in the shoulder joint, or arm pivot, 158 between the suspension arm 154 and the chassis 140 and provides redundancy. Each suspension arm 152 becomes an independent power system providing tractive effort from a common electrical, direct current ("DC")-link. A failure in a motor controller or motor therefore may not disable the UGV 100.

The chassis 140 provides the structure for vehicle integration with desirable stiffness, payload protection and thermal management. Important design considerations include: structural strength; stiffness; survivability; weight; stiffness-to-weight ratio; damage tolerance; reparability; corrosion resistance; modularity; and optimized component packaging and integration. In the illustrated embodiment, the chassis 140 comprises a shell (not indicated), or frame, with integral bulkheads (not shown) covered by a plurality of panels (also not indicated). The shell of the chassis 140 is comprised of graphite/epoxy sheets (not shown) sandwiching an aluminum honeycombed core (not shown). The panels are reinforced by KEVLAR™ to improve puncture and abrasion resistance. All points of attachment where significant loads are transferred are reinforced with glass fiber/epoxy inserts (not shown) and high-density foam (not shown).

The chassis 140 also houses charge-coupled device ("CCD") and acoustic sensors (not shown) located around the periphery of the chassis 105 for situational awareness. The illustrated embodiment employs four Emkay WP-3502 acoustic sensors, four Nevada Systems NSI-5000c CCD cameras, eight near field MASSA M-5000/220 ultrasonic sensors, and eight far field MASSA E-220B/26 ultrasonic sensors. Data generated from these sensors may be used to augment or may be used in conjunction with data generated from sensors aboard the virtual sensor mast 110. However, this is not necessary to the practice of the invention and these sensors may be omitted in some alternative embodiments.

The chassis 140 houses a power plant (not shown) that provides power and charges batteries (also not shown) used in powering various drives and other electrically powered components, including powering and/or recharging the UAV 120. More particularly, the illustrated embodiment employs a series hybrid power plant comprising a commercial, off-the-shelf-based single cylinder air-cooled Direct Injection ("DI") diesel engine (not shown) and a Variable Reluctance Motor ("VRM") used in conjunction with two parallel strings of lithium-ion batteries (not shown). More particularly, this power plant consists of a four-stroke, direct injection compression ignition (diesel) engine power plant, a motor/generator, a power distribution management system, an energy storage system, and in-hub variable reluctance motors. The VRM is efficient at high torques and low speeds, the exact operating envelope of the UGV 100 during silent motion.

A power management system (not shown) enhances battery life by efficiently managing the energy distribution throughout the vehicle. The energy from the batteries is converted to the appropriate DC level using bi-directional converters. The DC-link supports system efficiency by level-ranging from module voltage to 400 VDC depending on the speed of the vehicle. During engine start, the bi-directional inverter (generator controller) provides energy to start the diesel engine. Thereafter, the diesel engine is used to support the system and drive loads. The bi-directional converters reverse the energy flow from the DC-link to the battery packs and system loads. If the demand for the loads exceeds the engine generator capability, the bi-directional inverters provide the additional energy required from the batteries. Another function of the bi-directional inverter is to convert land power (i.e., 115, 208, and 240 VAC) to charge the batteries between missions or power the system for training, and maintenance.

Some embodiments include a mast base enclosure (not shown) housing a majority of the payload (also not shown) and centered in the front of the UGV 100. The mast base is pivoted in the center of the UGV 100 and has a total rotational travel of 180 degrees to allow it to be deployed vertically from the top or bottom of the UGV 100. In these embodiments, the portion of the chassis 140 on either side of the mast base enclosure is referred to as the "sponson." Much of the volume of each sponson is available for payload. There are three areas in the chassis 140 allocated for fuel and battery storage. One area is in the center of the UGV 100 and the other two are in the sponsons. The majority of the vehicle control and power electronics are located above the center fuel tank or in the areas on either side of the mast pivot in these embodiments.

Note that the UGV 100 of the illustrated embodiment is but one particular implementation. The present invention may be employed in virtually any suitably modified and/or equipped ground vehicle, whether manned or unmanned and regardless of whether it is robotic. For instance, the invention may be employed with wheeled vehicles whose suspension is not independently articulable, e.g., the HUMVEE. The invention may be employed on tracked vehicles, e.g., the Bradley fighting vehicle. The invention may also be employed on vehicles that are both wheeled and tracked, e.g., the now retired M-16 and M-3 half-tracks of World War II vintage. Furthermore, the invention is not limited to deployment on military vehicles, and may find applicability in civilian contexts.

Figure 3A:
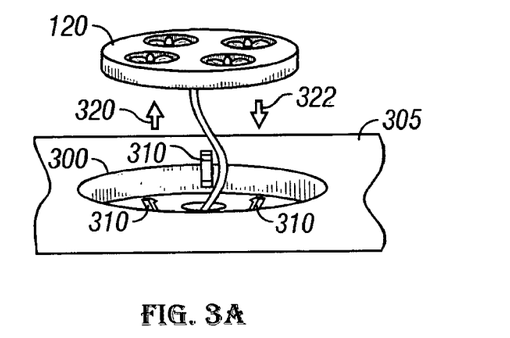
FIG. 3A–FIG. 3B illustrate the stowage and deployment of the unmanned airborne vehicle in the embodiment of FIG. 1.
Figure 3B:
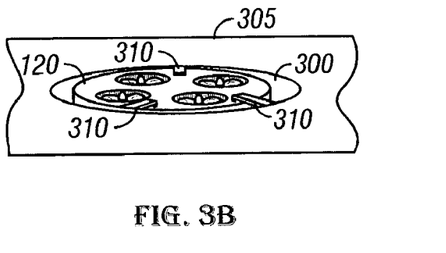

The UAV 120 of the illustrated embodiment is a VTOL aircraft including one or more ducted fans. The particular embodiment of FIG. 1 actually employs four ducted fans 162a–162d, but the number of ducted fans is not material to the practice of the invention. The UAV 120 may be deployed and stowed, as is best shown in FIG. 3A–FIG. 3B, in a recess 300 in the surface 305 of the chassis 140 of the UGV 100. When stowed, as shown in FIG. 3B, a plurality of clamps 310 secure the UAV 120 in the recess 300. To deploy the UAV 120, the clamps 310 can be released and the ducted fans 162a–162d activated until the UAV 120 elevates itself from the UGV 100, as indicated by the arrow 320. As the UAV 120 elevates, the electric motor and winch 205 of the tether management system 200, shown in FIG. 2, release the drum 210 so that the tether 130 plays out.

The UAV 120 elevates to some desired altitude to remotely sense the environment in which the UGV 100 is situated. Typically, the UGV 100 will not be moving during the deployment, or will move only very little. Also, the deployment will typically be of relatively short duration. Once the remote sensing is completed, the UAV 120 is retracted back into the recess 300, as indicated by the arrow 322. Note that the recess 300 may be oversized, as shown, and that the positions of the clamps 315 may be so dimensioned as to facilitate the retraction. To terminate the deployment, the electric motor and winch 205 can spool the drum 210 with force sufficient to overcome the lift exerted by the ducted fans 162a–162d. The ducted fans 162a–162d may be powered down some to facilitate retraction. The tether 130 is attached to the UAV 120 in a position selected, in part, to facilitate the retraction, as well. As the UAV 120 retracts into the recess 300, the clamps 310 engage the UAV 120 to secure it in the recess 300 until the next deployment. Note that the clamps 310 may be omitted in some embodiments where the recess 300 is deep enough.

Figure 4A:
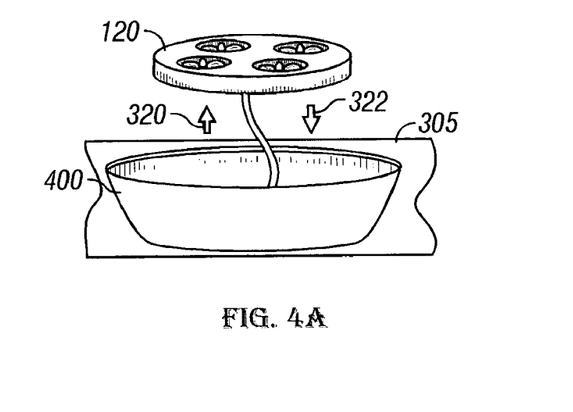
FIG. 4A–FIG. 4B illustrate the stowage and deployment of the unmanned airborne vehicle in the embodiment of FIG. 1 in a fashion alternative to that in FIG. 3A–FIG. 4B.
Figure 4B:
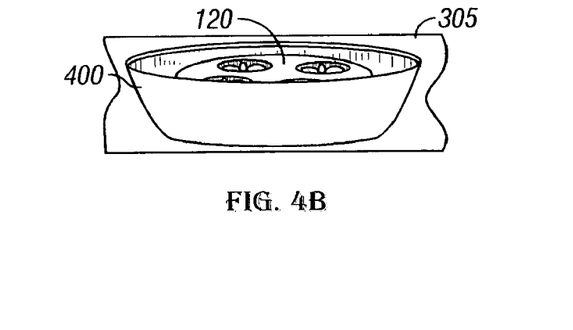

The UAV 120 may be stowed and deployed from the UGV 100 in any number of ways, some of which will depend on the implementation of the UAV 120. FIG. 4A–FIG. 4B illustrate a technique for stowing and deploying the UAV 120 alternative to that shown in FIG. 3A–FIG. 3B. In this implementation, the UAV 120 is stored in and deployed from a "basket" 400. The deployment and retraction are otherwise the same.

FIG. 5A–FIG. 5H illustrate a ducted fan UAV 500, that can be modified from that disclosed and claimed in United States Letters Patent No. 4,795,111, issued Jan. 3, 1989, to Moller International, Inc., as assignee of the inventor Paul S. Moller ("the '111 patent"). The particular ducted fan of the '111 patent can, as will be discussed further below, be readily modified to implement the present invention. Note that this particular UAV includes only a single ducted fan, rather than the four of the UAV 120 in FIG. 1. The limited number of ducted fans in the illustrated embodiment will improve the clarity and coherence of the discussion. However, an embodiment employing four such ducted fans will be discussed further below.

Figure 5A:
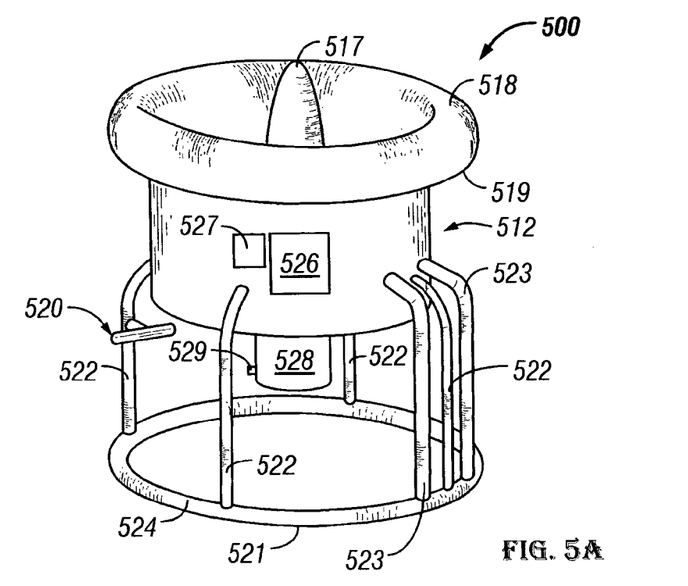
FIG. 5A is a view in perspective of an aerobotic single-engine ducted VTOL aircraft embodying the principles of the invention, looking slightly from above.
Figure 5B:
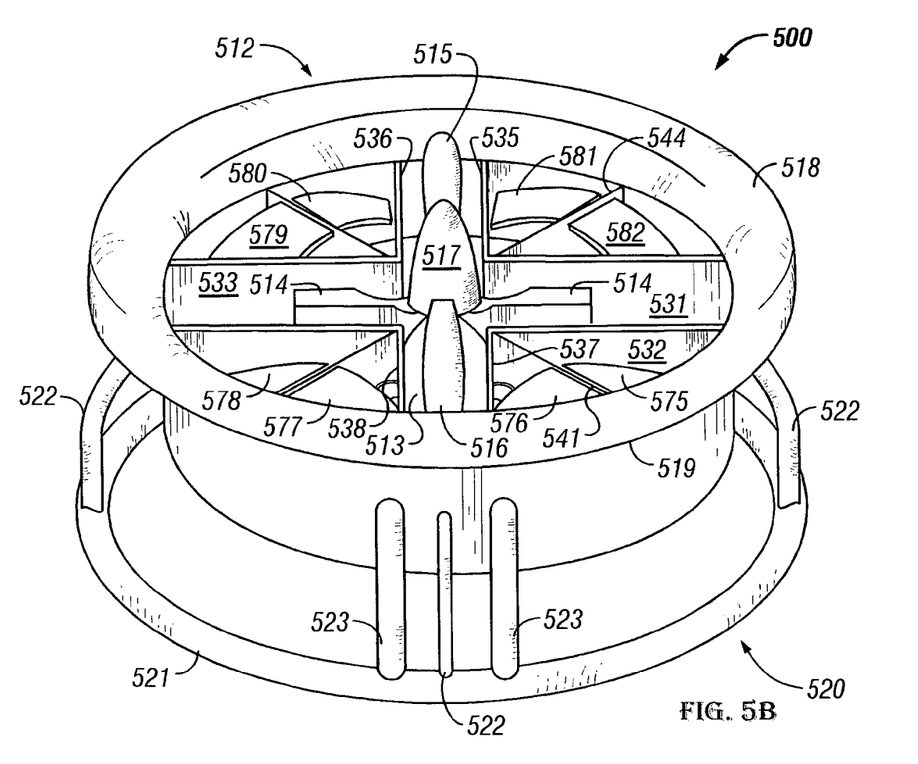
FIG. 5B is another view in perspective, looking from a higher viewpoint, of the aircraft of FIG. 5A.

More particularly, FIG. 5A–FIG. 5H show a single-engine ducted fan VTOL vehicle 500 with a propeller 511 and a duct 512. The propeller 511 is mounted horizontally on a shaft 513 and is powered by a single engine 514 below it. The illustrated propeller 511 has two blades 515 and 516 and a nose 517. The circular duct 512 has a curved flange 518 at its upper end and has a planar lower edge 519. As shown in FIG. 5A–FIG. 5B the duct 512 may have a support member 520 with a hollow bottom or base ring 521 and four support columns 522. The ring 521 also serves as a muffler and is connected by a pair of vertical exhaust tubes 523 to the exhausts from the engine 514, there being two such exhaust tubes for a two-cylinder engine 514. The exhaust gas goes down the tubes 523 into the ring 521 and passes out from the ring 521 at exhaust openings 524, spaced around the ring 521 at distances beginning about 90° away from the tubes 523 and extending downwardly at about 45°.

Mounted on the exterior face of the duct 512 is a series of control devices and other instrumentation, each a type of electronic device, including a detector and receiver 526, and various programmed control initiators 527, which control the engine or motor 514 and the various lever systems described below. In the illustrated embodiment, the motor 514 is an electrical motor powered by the UGV 100 over the tether 130 in a manner described more fully below.

Figure 5C:
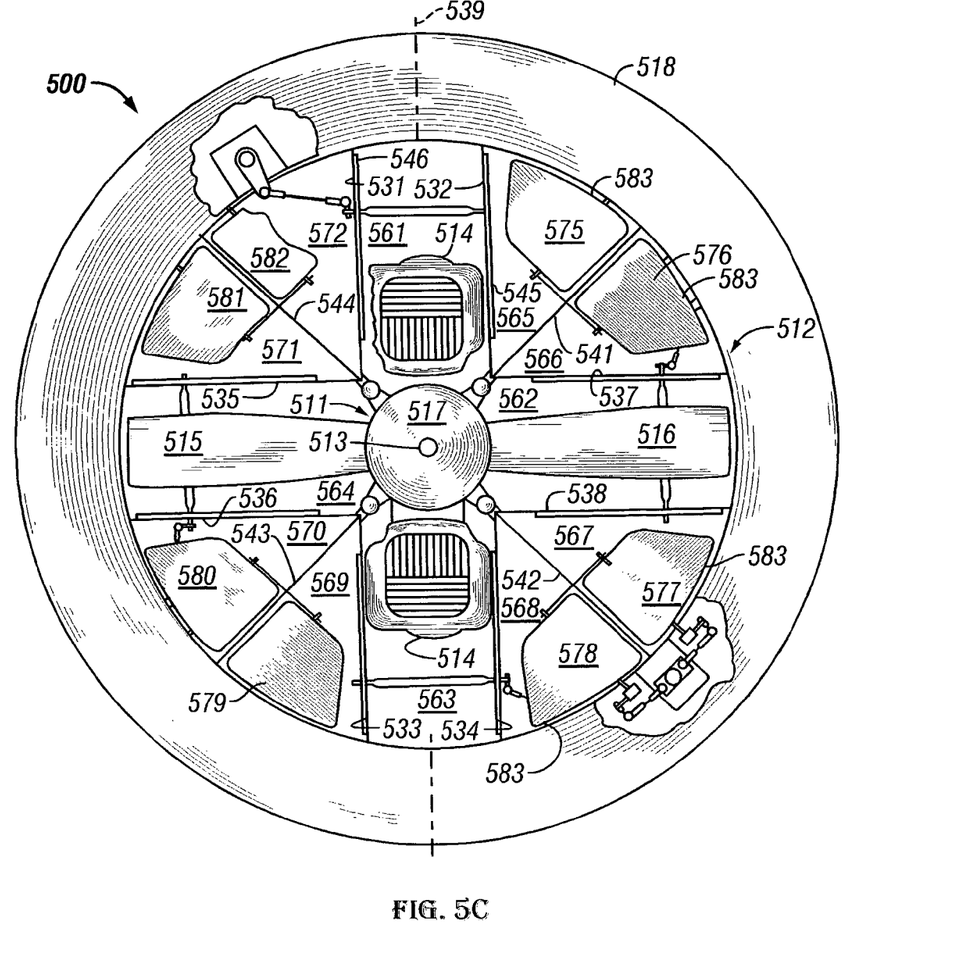
FIG. 5C is a top plan view thereof.
Figure 5D:
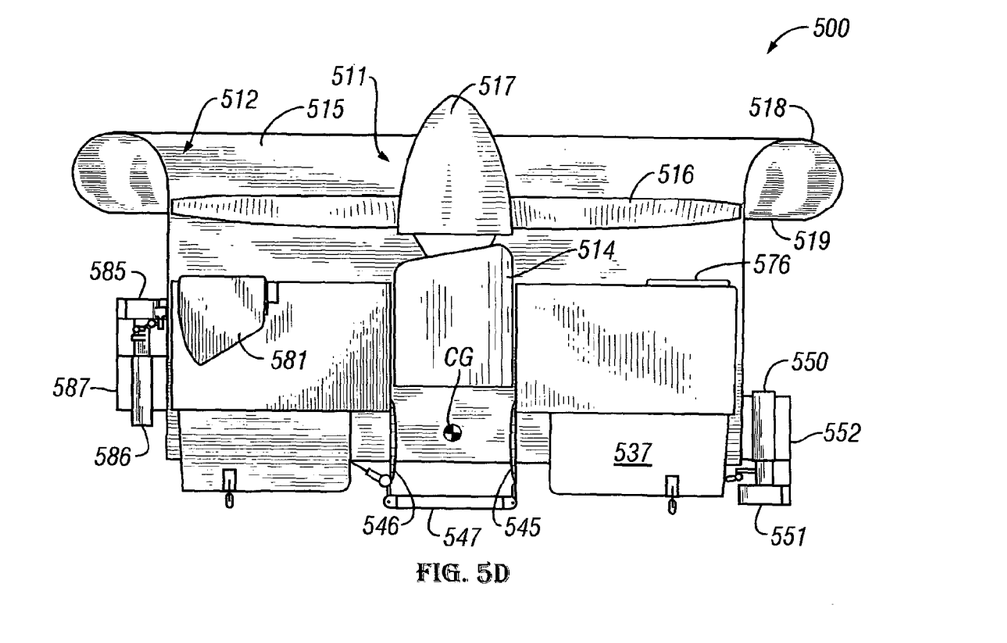
FIG. 5D is a view in section taken along the line 4—4 in FIG. 5C, with one spoiler shown vertical and one horizontal.

In the duct 512 are twelve fixed vanes 531, 532, 533, 534, 535, 536, 537, 538, 541, 542, 543, and 544. The eight identical vanes 531, 532, 533, 534, 535, 536, 537, and 538 are disposed along two mutually perpendicular axes. That is, there are four vanes 531, 532, 533, 534 arranged as two diametrically opposite pairs 531, 532 and 533, 534 parallel to one diametral line 539, shown in FIG. 5C. There are two other diametrically opposite pairs of vanes 535, 536 and 537, 538 parallel to a diametral line 541 perpendicular to the line 539. Each pair of vanes forms a generally rectangularly shaped duct segment and adjacent pairs form generally quadrant shaped duct segments. These eight vanes 531–538 are preferably not simply vertical planes but are preferably shaped as shown in FIG. 5F–FIG. 5G, and they each have a variable-camber flap 545 or 546 attached to their lower or trailing edge.

For yaw control, or control about the vertical axis, the flaps 545 and 546 of all eight of these vanes 531 through 538 move together in the same rotational direction, resulting in torque about the vertical axis. For translational control, the flaps 545 and 546 of two diametral pairs move together, shown in FIG. 5G, while the flaps 545 and 546 of the other diametral pairs either do not move or move in a direction or directions. As a result, a force is generated for accelerating the vehicle 500 horizontally at a speed up to a point where its aerodynamic drag equals its ventable translational force Preferably, each camber flap 545–546 is equal in area to its respective vane 531–538. As a result the center of pressure of the vane-flap combination occurs at the three-quarter chord position C back from the leading edge L, i.e., near the center of the camber flap 545 or 546, and this is where the center of pressure of the vanes occurs. This center of pressure is kept as close as possible to the position along the vertical-axis occupied by the center of gravity of the vehicle 500 and is preferably within the limits of the vertical extremities of the flaps 545–546.

Figure 5E:
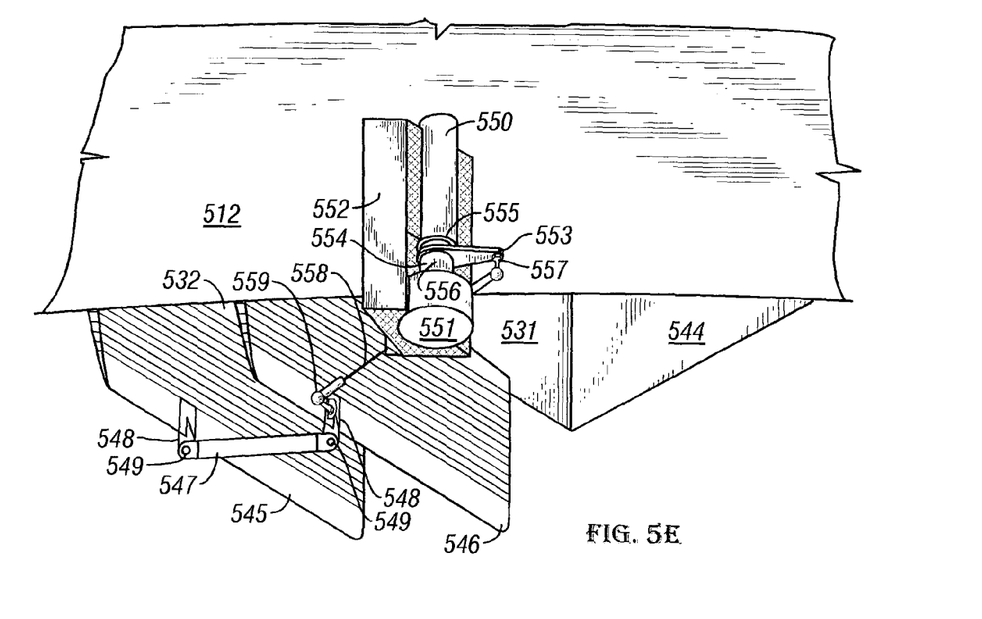
FIG. 5E is an enlarged fragmentary view in perspective of a portion of the aircraft of FIG. 5A, looking from below, showing a portion of the camber vane control.
Figure 5F:
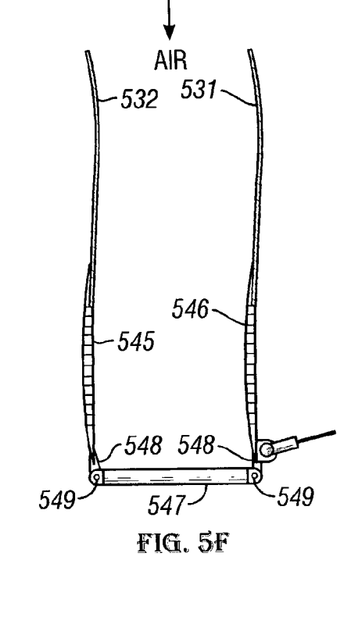
FIG. 5F is a simplified fragmentary view in elevation of one duct portion, showing two non-activated camber vanes.
Figure 5G:
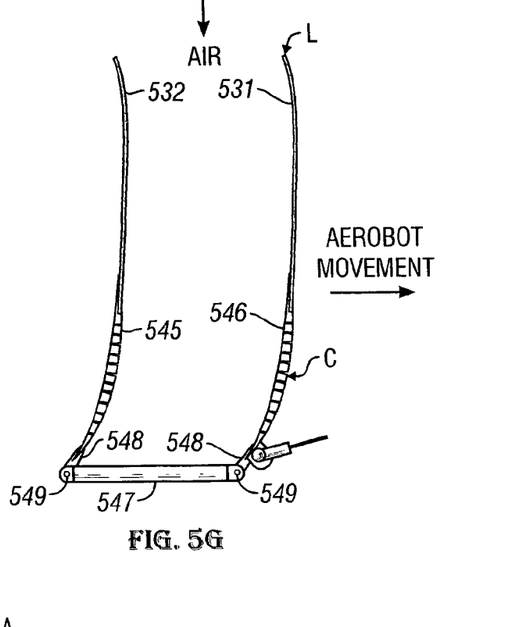
FIG. 5G is a view similar to FIG. 5F with the camber vanes actuated.

Each pair of flaps 545 and 546 is joined together by a tie rod 547 having a clevis clip 548 at each end pivoted to it by a pin 549, controlled, as shown in FIG. 5E, by a servomotor 550. The servomotor 550 is actuated by a potentiometer 551, and both are in a foam-rubber fitted housing 552. The servomotor 550 acts on the tie rod 547 through the vane control arm 553, having a sleeve 554 held on a servomotor shaft 555 by a recessed Allen-head screw 556. The arm 553 may act through a ball-and-socket joint 557 on a drag linkage 558, which operates on the tie rod 547 through another ball-and-socket joint 559.

The other four vanes 541, 542, 543, and 544, shown in FIG. 5B, are rigid and extend in from the wall of the duct 512 to bisect the right angles made by the mutually perpendicular vanes 532, 537 and 538, 534 and 533, 536 and 537, 531, shown in FIG. 5C. In other words the vanes 541, 542, 543, and 544 lie at an angle of 45° to the eight diametral vanes 532, 537 and 538, 534 and 533, 536 and 535, 531. Preferably, these four vanes 541, 542, 543, and 544 are not simply vertical planes but are shaped like the rigid upper portions of the vanes shown in FIG. 5F–FIG. 5G (but without the attachment of variable-camber vanes).

Between the vanes 531 and 532 is a generally rectangular duct segment or passage 561; between the vanes 533 and 534 is a diametrically opposite rectangular passage 563. At right angles to these openings are a rectangular passage 564 between the vanes 535 and 536 and a rectangular passage 562 between the vanes 537 and 538. Thus, between the vanes 532 and 537 is a quadrant divided into two equal passages 565 and 566 by the vane 541; between the vanes 538 and 534 is a quadrant shaped duct segment divided into two equal passages 567 and 568 by the vane 542; between the vanes 533 and 536 is a quadrant shaped segment bisected into two passages 569 and 570 by the vane 543; and between the vanes 535 and 531 is a quadrant shaped segment bisected into two passages 571 and 572 by the vane 544.

Each vane 541, 542, 543, and 544 preferably supports a pair of spoilers 575, 576 or 577, 578 or 579, 580 or 581, 582, one for each passage 565, 566, 567, 568, 569, 570, 571 and 572. The spoilers 575–582 each have a circular-arc outer rim 583 concentric with the duct 512 and are otherwise generally trapezoidal in shape to fill most of the outer portion of their respective passages 565–572 when in the fully closed or horizontal position, as depicted in FIG. 5B–FIG. 5C. When rotated down to their fully open or vertical position, they lie generally parallel to their respective vanes 541–544, as shown at 581 in FIG. 5D, and take up very little room in the passages 565–572.

Figure 5H:
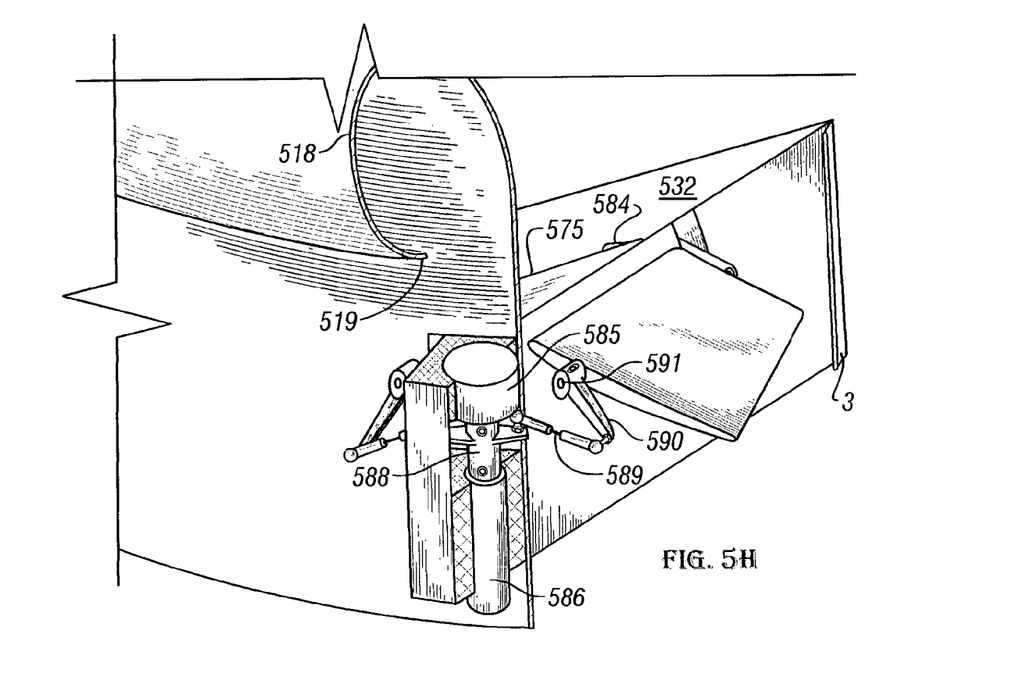
FIG. 5H is an enlarged fragmentary view in perspective of a portion of the aircraft of FIG. 5A, showing a pair of spoilers and their control linkages.

The spoilers 575–582 are each supported by their associated vanes 541–544 through a tension bracket 584 and are operated, as shown in FIG. 5H, via a remotely activated system embodying a potentiometer 585 supported with a servomotor 586 inside a housing 587. The servomotor 586 operates, like the servomotor 550, through a linkage arm 588 and a drag linkage 589 having a ball-and-socket joint at each end, and a lever arm 590 that rotates on shaft 591.

In each quadrant, a single servomotor 586 operates the pair of spoilers 575, 576, etc.; so that in each quadrant the spoilers are paired. Moreover, the pivot axis of each spoiler lies along and coincides with the position where the torque on its spoilers is minimized as a function of its angular position; thereby the torque required to deploy that pair of spoilers is reduced, and the size of the servomotors 586 is kept small. Since each spoiler 575–582 has its surface concentrated near the duct wall, the resulting control moment is maximized. Each spoiler may be made from lightweight wood, to minimize its inertia and provide rapid response to its servomotor 586.

The functional mixing of yaw and translation forces is preferably done electronically by the control circuits 527, with the vehicle 500 employing eight separate servomotors 550 and 586 for control. Thus, there are four servomotors 550 for yaw or translational controls and four servomotors 586 for pitch-and-roll controls. One servomotor controls one parallel set of yaw vanes or one pair of spoilers.

This system for controlling the flight of the vehicle 500 has the additional capability of being able to trim the vehicle 500 into a non-vertical position and holding that position through the use of translational control power. This may be desirable when a rigidly attached TV camera is used and is directed in the plane of vision by, for instance, gimballing the vehicle rather than gimballing the camera.

Figure 6:
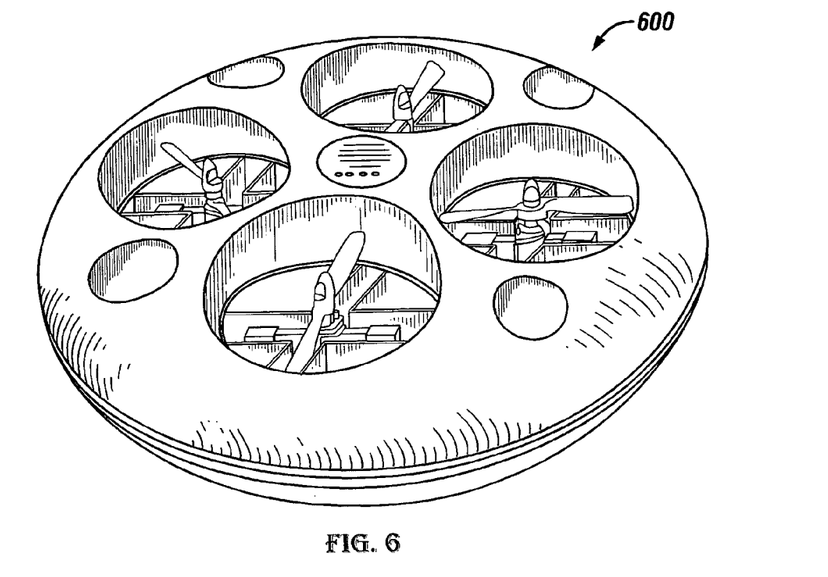
FIG. 6 is a view in perspective of a modified form of the unmanned airborne vehicle of FIG. 5A–FIG. 5H; embodying the invention, having four propellers and four ducts and no spoilers.

The principles of the UAV 500 can be extrapolated, as shown in FIG. 6, for use with multiple ducted fans in a single UAV, as in the case of the UAV 120 in FIG. 6. If the UAV employs a plurality of ducts, as in the case of the vehicle 600 shown in FIG. 6, then the spoiler approach can be augmented or even replaced by a system that alters the thrust in the individual ducts, either by individual fan pitch control or individual throttle engine control.

The illustrated UAV, whether utilizing a single-engine ducted fan (e.g., FIG. 5A–FIG. 5H) or utilizing a plurality of such ducted fans (e.g., FIG. 6), provides pitch-and-roll control seperate from translational control. The spoiler system is automatically driven by an on-board inertial reference system (not shown), and the spoilers are deployed only for the purpose of keeping the vehicle lift axis parallel to or coincident with the gravitational axis. The moment of inertia about the pitch-and-roll axis and the response time of the spoilers are both minimized, so that only very low forces are required from the spoilers 575–576, 577–578, 579–580, 581–582. The result is that there is little loss of lift; hence, there is little coupling between the pitch-and-roll control and the heave or vertical movement. The vehicle 500 may be trimmed to level, but trimming is not used for controlling maneuvers about the pitch-and-roll axis.

The spoilers 575–576, 577–578, 579–580, 581–582 are paired in each quadrant. This ensures that little or no torque or force is generated which might rotate the vehicle 500 about the vertical or yaw axis when the spoilers 575–576, 577–578, 579–580, 581–582 are employed. The pivot axis of each spoiler vane coincides with the position where the torque on the spoiler is minimized as a function of its angular position. This positioning reduces the amount of torque required to deploy the pair of spoilers and hence reduces the size of the servomotors required. Most of the spoiler surface is concentrated near the maximum duct diameter, in order to maximize the resulting control moment. Preferably, the spoilers 575–576, 577–578, 579–580, 581–582 are made of extremely light material in order to reduce their inertia and to obtain rapid spoiler response with reduced servomotor power.

Translational control is obtained by use of a flexible vane instead of a pivoted rigid vane. In a deflection vane system, it is desirable to recognize that a rigid vane generates two major problems when used to deflect a slip stream:

(1) The forces generated by swinging a rigid vane are highly nonlinear relative to the changing angle of the vane, and particularly when the aircraft is near the stall condition.

(2) The stall condition is reached by rigid vanes at fairly low angles of vane deflection, generally less than 15°. However, for significant translational forces, such as those which are required to move a vehicle of this type at a velocity greater than one-third of the slip stream velocity, the slip stream deflection required becomes significant and is greater than 15°.

Therefore, the illustrated UAV employs a variable-camber vane or flap, which is attached to the trailing edge of fixed anti-torque vanes that serve to remove the swirl introduced by the fan.

The UAV thus obtains translational control by redirecting the slip stream with vanes 575–576, 577–578, 579–580, 581–582 that are provided with flexible camber portions or flaps extending downwardly from an upper fixed rigid portion, and the vanes are mounted so that the center of lift or force providing the transverse force is at or as close as possible to the center of gravity of the vehicle. This mounting ensures that deflection of the variable-camber vane or flap does not generate significant moments about the center of gravity; such moments, if generated, would have to be overcome by the spoiler system. Small coupling moments are automatically dealt with by the spoiler system and result only from forces produced about the pitch-and-roll axis, due to translational control.

If the flexible portion of the vane is equal in size to the rigid upstream portion, then the transverse force (or center of pressure) of the rigid-flexible deflector vane occurs at approximately the three-quarter chord position back from the leading edge. Put another way, the center of pressure or lift appears to occur near the center of the flexible portion of the vane. In fact, this position is a function of the amount of vane deflection. For greater deflections this position is probably correct. For small deflections this center of pressure will be farther forward. Preferably, the center of left on the vane is at the center of gravity of the vehicle, on the vertical axis.

The variable-camber vanes act like a flap (or aileron) on a wing. Such a flap may involve comparatively small forces and be small in size relative to the forces it can generate. Thus, when a variable-camber vane system employs two or more vanes in parallel, a cascade vane effect is created. This cascade effect continues to deflect the slip stream up to 90°, if that should be necessary. However, it is unlikely that deflection greater than 30° will ever be required.

More succinctly summarized, there is least one ducted fan, comprising power means, a horizontally mounted fan connected to and driven by the power means for causing a vertically and downwardly directed airstream, and a cylindrical duct that extends around and beneath the fan, for confining the airstream. In the duct is a vane system comprising two mutually perpendicular pairs of diametrically opposite generally rectangularly shaped duct segments, each defined and bounded by a pair of generally vertical stationary walls extending across the duct parallel to a diametral line thereacross. Each pair of these walls also defines one boundary of a quadrant shaped duct segment located between adjacent wall pairs. Each duct segment forming a wall includes an upper, rigid portion having a variable-camber flap portion affixed to its lower extremity. A first set of remotely controlled servo motors is employed for varying the camber of each of the flaps. In each pair of variable vanes, the flap camber is at all times the same in amount and direction for both flaps.

The UAV disclosed in the '111 patent can be readily modified to accommodate and take advantage of the present invention. The UAV of the '111 patent includes an antenna for radio communication, which is unnecessary in the present invention. Thus, the antenna and the transmitter/receiver associated with radio communication are eliminated from the implementation of the UAV 120. A connection for the tether 130 will similarly need to be added. Furthermore, the UAV 120 will typically fly at lower altitudes than the UAV of the '111 patent, and can receive power from the UGV 100 over the tether 130. Thus, the internal combustion engine (and gas tank) for the UAV of the '111 patent are replaced by a lighter electric motor. The invention admits wide variation in the sensing capabilities that may be implemented on the UAV 120. Further modification may be desirable to accommodate different sensing capabilities, as will be discussed further below.

Note that, in the illustrated embodiment, the UAV 120 is intended to hover above the UGV 100 while the UGV 100 is stopped. The UAV 120 consequently need only provide vertical lift, and need not provide horizontal propulsion. Thus, the weight and complexity of the UAV 120 can be reduced relative to conventional UAVs. Note also that in the illustrated embodiment, power is provided to the propulsion systems and sensor packages aboard the UAV 120 over the tether 130 from the UGV 100. This results in further savings in weight and complexity since the UAV 120 need not provide its own power. The UAV 120 and/or its sensor suite can also be recharged from the UGV 100 over the tether 130 and/or recharged and/or refueled from the UGV 100 when not deployed.

Returning to FIG. 1, the tether 130 may be any suitable transmission medium known to the art. For instance, in the illustrated embodiment, the tether 130 is comprised of one or more optical fibers cabled together. Alternative embodiments may employ coaxial cables or twisted wire pairs. The present invention is not limited by the implementation of this aspect. However, the characteristics of various media may affect the design of some implementations in ways well known to the art. For example, some media do not spool as well or as tightly as do other media, and the dimensions of the drum 210, shown in FIG. 2, will be sized accordingly. In some embodiments, the UAV 120 may receive power from the UGV 100 over the tether 130. The tether 130 in such embodiments then includes a power lead over which the UAV 120 receives power and the tether becomes an umbilical.

Returning once again to FIG. 1, the UAV 120, when deployed, remotely senses the environment in which the UGV 100 is situated. As was mentioned above, the UAV 500 illustrated in FIG. 5A–FIG. 5H is equipped with a suite of sensors including a detector and receiver 526. The type and number of sensors will be implementation specific, and may employ almost any type of remote sensing technology. In one proposed implementation, illustrated in FIG. 7, the remote sensing technologies includes an active LADAR system and a passive infrared system. Note, however, that the number and type of sensors in the sensor suite will be implementation specific. For instance, in some embodiments, the sensor suite may comprise a single, passive IR sensor. One particular embodiment is described immediately below.

Figure 7:
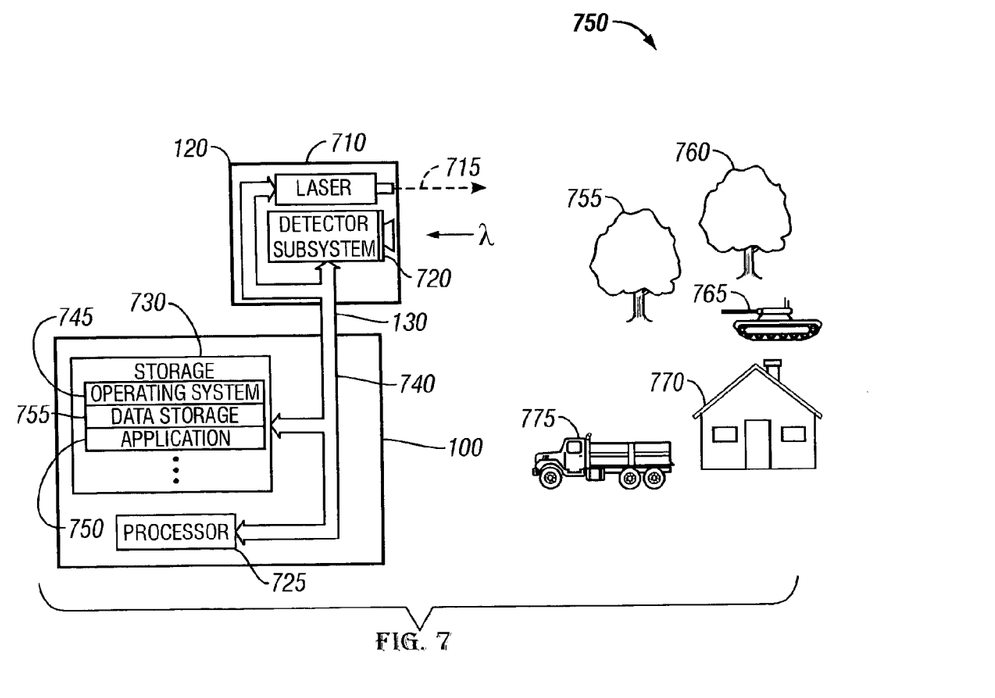
FIG. 7 illustrates the acquisition of data in one particular embodiment.

In the proposed embodiment of FIG. 7, the UAV 120 includes a laser 710 that produces a laser signal 715, a detector subsystem 720, a processor 725, and an electronic storage 730 communicating via a bus system 740. The processor 725 may any kind of processor, such as, but not limited to, a controller, a digital signal processor ("DSP"), or a multi-purpose microprocessor. The electronic storage 730 will probably be magnetic (e.g., some type of random access memory, or "RAM", device), but may also be optical, in whole or in part, in some embodiments. The storage 730 may also include removable storage (not shown), such as a floppy magnetic disk, a zip magnetic disk, or an optical disk. The bus system 740 may employ any suitable protocol known to the art to transmit signals. Note that the bus system 740, in this particular embodiment, transmits over the tether 130. Particular implementations of the laser 710, laser signal 715, and detector subsystem 720 are discussed further below.

The processor 725 controls the laser 710 over the bus system 725 and processes data collected by the detector subsystem 720 from an exemplary scene 750. The scene 750 includes trees 755 and 760, a military tank 765, a building 770, and a truck 775. The tree 755, tank 765, and building 770 are located at varying distances from the system 700. Note, however, that the scene 750 may have any composition. One application of the remote sensing system 700, as shown in FIG. 7, may be to detect the presence of the tank 765 within the scene 750. A second application may be to detect objects such as the trees 755, 760, or negative obstacles (not shown). The processor 725 operates under the direction of the operating system 745 and application 750 to fire the laser 710 and process data collected by the detector subsystem 720 and stored in the data storage 755 in a manner more fully described below.

Figure 8:
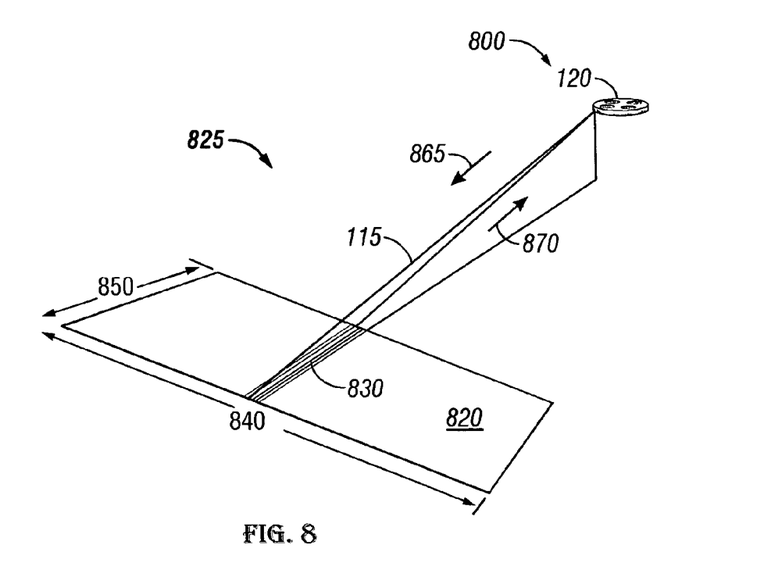
FIG. 8 depicts the operation of an active LADAR system on the unmanned airborne vehicle of the unmanned ground vehicle in FIG. 1 in the illustration of FIG. 7.

The operation of the LADAR system aboard the UAV 120 is conceptually illustrated in FIG. 8. The LADAR system includes the laser 710 of FIG. 7 as well as some portions of the detector subassembly 720. The LADAR system collects three-dimensional data from a field of view 825, shown in FIG. 8, within the scene 750, shown in FIG. 7. The laser signal 715 is transmitted by the laser 710 on the UAV 120 to scan a geographical area called a scan pattern 820, shown in FIG. 8. Each scan pattern 820 is generated by scanning elevationally, or vertically, several times while scanning azimuthally, or horizontally, once within the field of view 825 for the UAV 120 within the scene 750, shown in FIG. 7. The scan patterns are sometimes, and will be hereafter herein, referred to as "footprints." FIG. 8 illustrates a single elevational scan 830 during the azimuthal scan 840 for one of the footprints 820. Thus, each footprint 820 is defined by a plurality of elevational scans 850 such as the elevational scan 830 and the azimuthal scan 840. The velocity and depression angle of the sensor with respect to the horizon, and total azimuth scan angle of the LADAR system, determine the footprint 820 on the ground.

The laser signal 715 is typically a pulsed signal and may be either a single beam or a split beam. Because of many inherent performance advantages, split beam laser signals are typically employed by most LADAR systems. A single beam may be split into several beamlets spaced apart from one another by an amount determined by the optics package (not shown) aboard the UAV 120 transmitting the laser signal 715. Each pulse of the single beam is split, and so the laser signal 715 transmitted during the elevational scan 850 in FIG. 8 is actually, in the illustrated embodiment, a series of grouped beamlets. The optics package aboard the UAV 120 transmits the laser signal 715 while scanning elevationally 850 and azimuthally 840. The laser signal 715 is continuously reflected back to the UAV 120, which receives the reflected laser signal through the detector subsystem 820.

While the LADAR system is operating, the detector subsystem 820 is also passively detecting infrared ("IR") radiation from the scene 850. The IR detection is "passive" because the detected radiation does not result from energy introduced to the scene 850 by the sensors. The IR detection comprises a passive IR imaging of the scene 750 by a portion of the detector subsystem 720. This produces a two-dimension passive image data set with each pixel (picture element) having passive intensity information corresponding to the magnitude of the passive IR energy collected for that pixel. In some embodiments, the same detector may be used for both the active LADAR and passive infrared detection, e.g., U.S. Pat. No. 6,323,941, entitled "Sensor Assembly for Imaging Passive Infrared and Active LADAR and Method for Same," issued Nov. 27, 2001, to Lockheed Martin Corp. as the assignee of the inventors Evans, et al.

Remote sensing techniques combining laser and infrared technologies are known to the art. See, e.g.:

U.S. Pat. No. 6,359,681, entitled "Combined Laser/FLIR Optics System," issued Mar. 19, 2002, to Lockheed Martin Corp. as the assignee of the inventors Housand, et al.;

U.S. Pat. No. 6,323,941, entitled "Sensor Assembly for Imaging Passive Infrared and Active LADAR and Method for Same," issued Nov. 27, 2001, to Lockheed Martin Corp. as the assignee of the inventors Evans, et al.;

U.S. Pat. No. 5,345,304, entitled "Integrated LADAR/FLIR Sensor," issued Sep. 6, 1994, to Texas Instruments Incorporated, as the assignee of the inventor John E. Allen; and U.S. Pat. No. 4,771,437, entitled "Integrated Laser/FLIR Rangefinder," issued Sep. 13, 1988, to Texas Instruments Incorporated, as the assignee of the inventors Powell, et al.

Any suitable approach known to the art may be used to implement this aspect of the present invention. The LADAR system produces a LADAR image of the scene 750 by detecting the reflected laser energy to produce a three-dimensional image data set in which each pixel of the image has both z (range) and intensity data as well as x (horizontal) and y (vertical) coordinates. The IR system generates an IR image comprised of two-dimensional data.

Different embodiments may, however, employ different sensing capabilities depending on intended mission profiles. As those in the art having the benefit of this disclosure will appreciate, many engineering considerations go into the design of any given implementation. Weight and size of the sensors, for instance, should be considered in light of the lift capacity of the UAV 120. Common types of remote sensors include a day camera, a FLIR sensor, a laser rangefinder, and a Global Positioning System ("GPS") sensor. Table 1, below, lists several sensors that might be employed in various embodiments according to a purpose for which their data may be employed. Note, however, that other sensors, sensor suites, and assemblies may be employed in alternative embodiments. For instance, some embodiments may employ TV cameras (day or night, i.e., low light cameras) and nuclear, biological and chemical ("NBC") sensors.

TABLE 1

Sensor Payloads

| Purpose | Sensor |
|---|---|
| Targeting | SWIR, Indigo Merlin NIR w/50 MM Fixed FLIR - Long Lens, Indigo Alpha Target Designator, Litton - LLDR |
| Perception | Daylight Cameras - Watec 902S (Stereo) FLIR - Short Lens and Long Lens (Same as Above) LADAR, SRI |
| Other Sensors and Electronics | PC-104/CPU w/VGA (Real-time Devices) Sony EX470 Video w/18x Zoom Pan and Tilt (Directed Perception, PTU-46-17.5) |

The data generated by the sensors aboard the UAV 120 is then transmitted over the tether 130 and the bus system 740. The data is captured in the data storage 755 and processed by the processor 725 under the control of the application 750. The data may be processed in any suitable manner known to the art, depending on the nature of the data collected and the reason for which it is collected. For instance, the data may be processed to identify obstacles for navigating the scene 750. See, e.g.:

Hebert, et al., "Evaluation and Comparison of Terrain Classification Techniques from LADAR Data for Autonomous Navigation," 23d Army Science Conference (December 2002), available over the Internet;

Bellutta, et al, "Terrain Perception for DEMO III," Proceedings of the 2000 Intelligent Vehicles Conference, (2000);

Macedo, et al., "Ladar-based Discrimination of Grass from Obstacles for Autonomous Navigation," ISER 2000 (2000); and Matthies, et al., "Obstacle Detection for Unmanned Ground Vehicles: A Progress Report," Robotics Research: Proceedings for the 7$^{th}$ International Symposium (1996).

However, in some embodiments, the data may be processed for reasons other than navigation. For instance, in military environments, the data might be processed through an automatic target recognition ("ATR") system to determine whether some obstacle is a vehicle and, if so, whether a friend or a foe. See, e.g.:

U.S. Pat. No. 5,867,118, entitled "Apparatus for and Method of Classifying Patterns," issued Feb. 2, 1999, to Lockheed Martin Corp. as the assignee of the inventors McCoy, et al.;

U.S. Pat. 5,893,085, entitled "Dynamic Fuzzy Logic Process for Identifying Objects in Three-Dimensional Data," issued Apr. 6, 1999, to Lockheed Martin Corp. as the assignee of the inventors Phillips, et al.;

U.S. Pat. 5,852,492, entitled "Fused Lasar Range/Intensity Image Display for a Human Interpretation of Lasar Data," issued Dec. 22, 1998, to Lockheed Martin Corp. as the assignee of the inventors Nimblett, et al.;

These examples are illustrative only, and the list is not exhaustive. Other embodiments may process the data in still other ways for still other purposes.

The use of the tether 130 in the virtual sensor mast 110 imparts numerous advantages over conventional practice. The data may be more simply formatted since there is no danger of receipt by the wrong UGV 100. The data is generally more free of noise because it is not broadcast wirelessly and because fewer instruments (i.e., no transmitter, no receiver) are needed. Consequently, the data is generally easier to process relative to data collected by conventional, untethered UAVs. At the same time, the data can be acquired at an aspect angle greater that that available from mast mounted sensor packages. Thus, it is relatively easier to identify negative obstacles (e.g., ditches) and cul-de-sacs relative to mast-mounted sensors. Deployment of the UAV 120 also permits the UGV 100 to hide the chassis 105 while peering over defilade positions, buildings and water. The additional height afforded by deploying the UAV 120 with the tether 130 also reduces multi-path error, which improves data quality and eases data processing.

In the illustrated embodiment, the UGV 100 can be operated in several control modes including:

tele-operation, characterized by passive suspension compliance and manually commanded articulation;

tele-managed, characterized by active suspension compliance, active self-articulation; and semi-autonomous, characterized by active suspension compliance, active self-articulation.

Capabilities associated with the various control modes in the illustrated embodiment are listed in Table 2.

TABLE 2

Capabilities Matrix

| Control Class | Obstacle Capability |
|---|---|
| Tele-Operation | obstacle course, includes each of the following- articulation over 0.5–0.75 m step 0.5–0.75 m step drive off |

TABLE 2-continued

Capabilities Matrix

| Control Class | Obstacle Capability |
|---|---|
| Tele-Managed | flat, benign terrain at 20 kph<br>side slope stability<br>max up-slope and down-slope climb<br>high center recovery w/mast<br>inverted operation<br>40 kph in tall grass<br>flip-over recovery<br>moderate terrain at 20 kph<br>high wall stand-up & peek over<br>GPS waypoint navigation (for total<br>endurance testing on closed circuit courses |
| Semi-Autonomous | very rough terrain at 10 kph<br>silent operations in very rough terrain<br>at 6 kph<br>canonical trench crossing (quasi-<br>static)<br>canonical wall crossing (quasi-static)<br>1 meter step climb (quasi-static)<br>active ground pressure control<br>walking in very rough terrain<br>transition to and from water<br>Semi-Autonomous, Performance<br>Envelop Expansion:<br>Collaborative (using test mule as<br>surrogate) obstacle crossing assistance<br>Chimney-climb demo |

In the illustrated embodiment, tele-operation and tele-management are performed through an Operator Control Unit ("OCU", not shown). The OCU is an extremely lightweight, man portable, hand-held and wearable unit remote from the UGV 100 (and out of harm's way), connected via military RF command link. It includes tele-operational capability as well as data display, storage and dissemination. A secondary fiber optic link can be used when RF signals are undesirable. The general microprocessor-based system has easily expandable I/O capabilities and substantial memory/processing power, providing much more flexibility and extensibility in the design. Exemplary OCUs with which this aspect of the invention can be implemented include, but are not limited to, FBI-Bot, AST, RATLER, DIXIE, SARGE, and TMSS.

The OCU of the illustrated embodiment also encompasses standard interfaces for versatility and future expandability; conforms with military specifications regarding temperature, humidity, shock, and vibration; allows operator to independently tele-operate single or multiple UGVs; uses standard military symbology to display location, movement, and status of friendly, hostile, and unknown units; represents terrain maps and nuclear, biological and chemical ("NBC") assessments using military grid reference system; and can provide auditory feedback for system status or relaying information from acoustic sensors onboard. The OCU provides real-time vehicle control capabilities as well as situational awareness displays for the forward element. The display can be wrist-mounted, head-mounted, or integral to the computing unit.

More particularly, in the illustrated embodiment, a map display (not shown) is updated in real-time with data from one or more UGVs 100. Standard military symbology, such as is detailed in MIL-STD-2525B, displays the location, movement and status of friendly, hostile and unknown units. Vehicle status is displayed continually beside the unit icons and optionally with popup display of more detailed status information. Sensory data from the NBC detector and other sensory payloads are overlaid on the map display. Laser range finder and optical sensor gaze direction are represented on the display as a line radiating from the UGV icon. The terrain maps and NBC assessments are represented using the military grid reference system. Auditory feedback can be provided for system status or relaying information from acoustic sensors onboard the UGV.

Tele-operation of a single UGV 100 can be done with a first-person perspective view through use of real-time video and pointing device to control vehicle course and speed. Tele-management of single or multiple UGVs 100 can be accomplished via manipulating the corresponding UGV icons on the map to set destination objectives and paths. The real time video display can optionally be zoomed to fill the display with overlaid vehicle status appearing in a head-up display. The real-time video display also can be used during reconnaissance to show the live video view from the UGV 100 as if through binoculars. Multiple UGVs 100 can be controlled via mission orders issued by manipulating the UGV fleet icons on the map display or by issuing high-level commands, such as to surround a particular objective or to avoid a particular area while moving autonomously.

Figure 9:
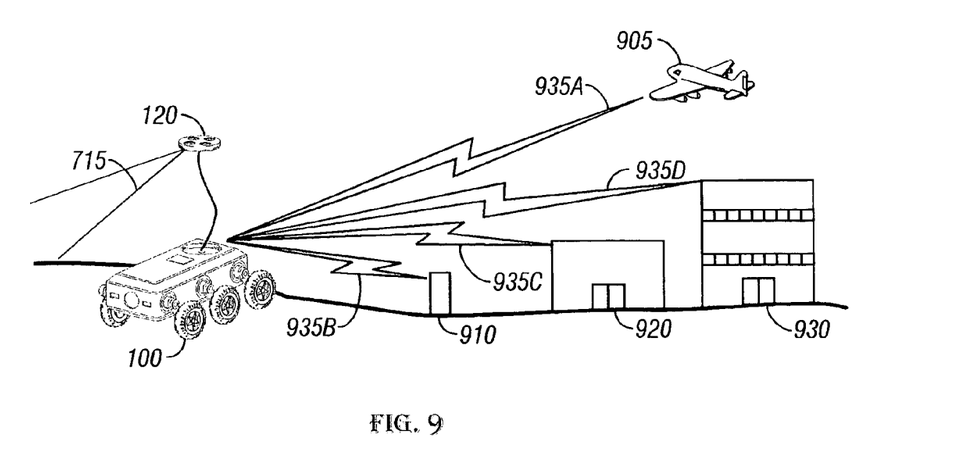
FIG. 9 illustrates several options for controlling the ground vehicle of FIG. 7.

Note, however, that tele-operation and tele-management of the invention is not so limited. Various alternatives for remote operation and management of the UGV 100 are illustrated in FIG. 9. For instance, control in these embodiments may be exercise from aboard an airborne command center 905, at a forward observation post 910, at a rear-echelon command and control center 920, or at a central processing facility 930 over communications links 935a–935d. The forward observation post 910, rear-echelon command and control center 920, and the central processing facility 930 may be airborne, ground-based (as shown) or marine. The communications links 935a–935d may be direct, line of sight communications or relayed by satellite (not shown).

Figure 10A:
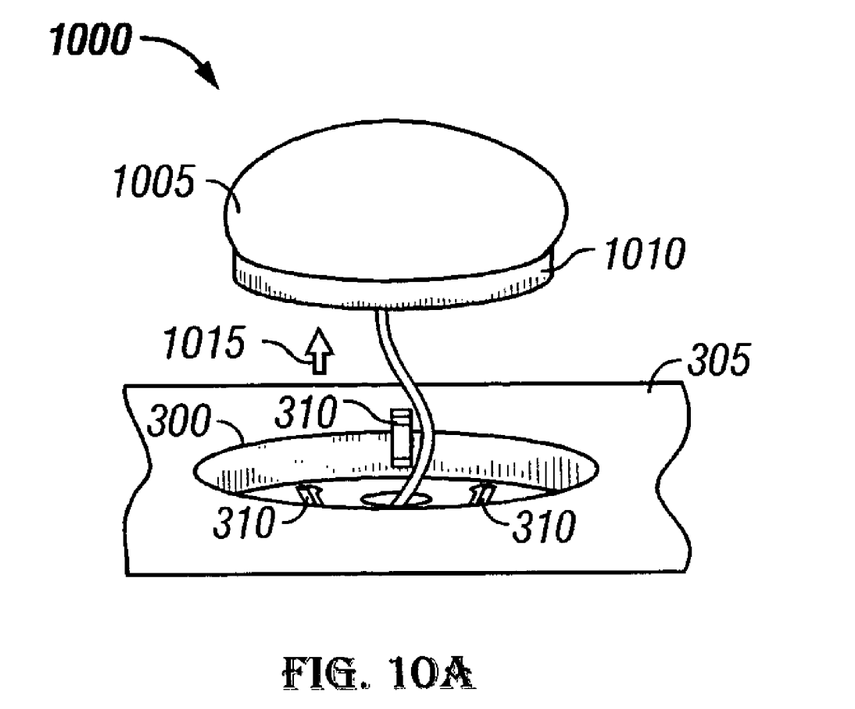
FIG. 10A–FIG. 10B depict an embodiment alternative to that illustrated in FIG. 1.
Figure 10B:
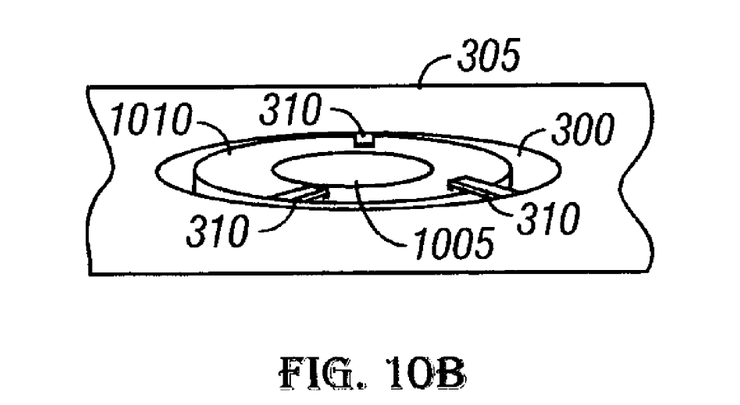

The invention admits wide variation. Consider the embodiment of FIG. 10A–FIG. 10B. In FIG. 10A–FIG. 10B, a UAV 1000 is implemented with a lighter-than-air vehicle, e.g., a balloon 1005 fitted with a sensor platform 1010. The UAV 1000 can be stowed, as shown in FIG. 10B, in the same manner as the UAV 120 in FIG. 3B. The balloon 1005 is filled from a source of pressurized gas (not shown), and the latches 310 released. As the balloon 1005 rises, indicated by the arrow 1015 in FIG. 10A, the UAV 1000 lifts from the recess 300, thereby lifting the sensor platform 1010. Once the sensing is complete, the UAV 1000 can be winched back to the recess 300 by the tether management system 200, shown in FIG. 2, and secured by the latches 310. The balloon 1005 can then be deflated and the UAV 1000 stowed away. Alternatively, the tether 130 the deployment can terminating by severing or releasing the tether 130, and the UAV 1000 permitted to float away. Note that, in this latter variation, the sensors aboard the sensing platform 1010 will preferably be inexpensive, as they may not be recoverable. It may also be desirable provide for the tether 130 to be detachable from the UGV 100 and/or the UAV 1000 and/or to be readily replaceable. Alternatively, the UAV 1000 can be retrieved, the sensor platform 1010 (or just the sensors mounted thereon) retained, the balloon 1005 (or the rest of the UAV 1000) severed and allowed to float away.

Thus, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A virtual sensor mast for a ground vehicle, comprising:
   an unmanned airborne vehicle capable of lifting itself from the ground vehicle upon deployment therefrom;
   a sensor suite mounted to the unmanned airborne vehicle; and
   a tether between the unmanned airborne vehicle and the ground vehicle over which the sensor suite is capable of communicating sensed data upon deployment.

2. The virtual sensor mast of claim 1, wherein the unmanned airborne vehicle comprises a ducted fan.

3. The virtual sensor mast of claim 2, wherein the ducted fan further comprises a plurality of ducted fans.

4. The virtual sensor mast of claim 1, wherein the unmanned airborne vehicle comprises a lighter-than-air vehicle.

5. The virtual sensor mast of claim 4, wherein the lighter-than-air vehicle comprises:
   an inflatable balloon; and
   a sensor platform affixed to the inflatable balloon and to which the sensor suite is mounted and the tether is affixed.

6. The virtual sensor mast of claim 1, wherein the sensor suite includes at least one of:
   an acoustic sensor;
   an optical sensor;
   a television camera;
   a nuclear, biological and chemical detector;
   an infrared sensor; and
   a Global Positioning System sensor.

7. The virtual sensor mast of claim 1, wherein the sensor suite comprises a plurality of sensors.

8. The virtual sensor mast of claim 1, wherein the tether comprises at least one of:
   an optical fiber:
   a power lead;
   a twisted wire pair; and
   a coaxial cable.

9. The virtual sensor mast of claim 1, wherein the tether is capable of transmitting power to the unmanned airborne vehicle.

10. The virtual sensor mast of claim 1, further comprising a tether management system.

11. A ground vehicle, comprising:
    a chassis;
    a virtual sensor mast, including:
       an unmanned airborne vehicle capable of lifting itself from the chassis upon deployment therefrom;
       a sensor suite mounted to the unmanned airborne vehicle;
       a tether between the unmanned airborne vehicle and the chassis over which the sensor suite is capable of communicating sensed data upon deployment
    a processing system for controlling the operation of the ground vehicle, including the virtual sensor mast.

12. The virtual sensor mast of claim 11, wherein the unmanned airborne vehicle a comprises a ducted fan.

13. The virtual sensor mast of claim 12, wherein the ducted fan further comprises a plurality of ducted fans.

14. The virtual sensor mast of claim 11, wherein the unmanned airborne vehicle comprises a lighter-than-air vehicle.

15. The virtual sensor mast of claim 14, wherein the lighter-than-a vehicle comprises:
    an inflatable balloon; and
    a sensor platform affixed to the inflatable balloon and to which the sensor suite is mounted and the tether is affixed.

16. The virtual sensor mast of claim 11, wherein the sensor suite includes at least one of:
    an acoustic sensor;
    an optical sensor;
    a television camera;
    a nuclear, biological and chemical detector;
    an infrared sensor; and
    a Global Positioning System sensor.

17. The virtual sensor mast of claim 11, wherein the sensor suite comprises a plurality of sensors.

18. The virtual sensor mast of claim 11, wherein the tether comprises at least one of:
    an optical fiber;
    a power lead;
    a twisted wire pair; and
    a coaxial cable.

19. The virtual sensor mast of claim 11, wherein the tether is capable of transmitting power to the unmanned airborne vehicle.

20. The virtual sensor mast of claim 11, further comprising a tether management system.

21. The ground vehicle of claim 11, wherein the processing system is capable of processing data sensed by the sensor suite.

22. The ground vehicle of claim 21, wherein the processing system is positioned within the chassis.

23. The ground vehicle of claim 11, further comprising a receiver capable of receiving remotely generated command and control instructions for control of the ground vehicle.

24. The ground vehicle of claim 11, further comprising a transmitter capable of transmitting data from the sensor suite to a remote location.

25. The ground vehicle of claim 11, further comprising means for stowing the unmanned airborne vehicle.

26. The ground vehicle of claim 25, wherein the stowing means comprises a recess in the chassis into which the unmanned airborne vehicle may be retrieved.

27. The ground vehicle of claim 25, wherein the stowing means comprises a basket mounted on the chassis into which the unmanned airborne vehicle may be retrieved.

28. The ground vehicle of claim 11, further comprising a tether management system housed in the chassis.

29. A vehicle, comprising:
    a chassis;
    a receiver mounted on the chassis; and
    an unmanned airborne vehicle tethered to the chassis, the unmanned airborne vehicle housing at least one sensor and capable of transmitting sensed data to the receiver.

30. The virtual sensor mast of claim 29, wherein the unmanned airborne vehicle comprises a ducted fans.

31. The virtual sensor mast of claim 30, wherein the ducted fan further comprises a plurality of ducted fans.

32. The virtual sensor mast of claim 29, wherein the unmanned airborne vehicle comprises a lighter-than-air vehicle.

33. The virtual sensor mast of claim 32, wherein the lighter-than-air vehicle comprises:
    an inflatable balloon; and
    a sensor platform affixed to the inflatable balloon and to which the sensor suite is mounted and the tether is affixed.

34. The virtual sensor mast of claim 29, wherein the sensor suite includes at least one of:
- an acoustic sensor;
- an optical sensor;
- a television camera;
- a nuclear, biological and chemical detector;
- an infrared sensor; and
- a Global Positioning System sensor.

35. The virtual sensor mast of claim 29, wherein the sensor suite comprises a plurality of sensors.

36. The virtual sensor mast of claim 29, wherein the tether comprises at least one of:
- an optical fiber;
- a power lead;
- a twisted wire pair; and
- a coaxial cable.

37. The virtual sensor mast of claim 29, wherein the tether is capable of transmitting power to the unmanned airborne vehicle.

38. The virtual sensor mast of claim 29, further comprising a tether management system.

39. A method far use in operating a ground vehicle, comprising:
- elevating a tethered unmanned airborne vehicle from the ground vehicle to a predetermined height;
- sensing environmental conditions surrounding the ground vehicle from the unmanned airborne vehicle;
- transmitting the sensed data from the unmanned airborne vehicle to the around vehicle; and
- terminating the deployment.

40. The method of claim 39, wherein elevating the unmanned airborne vehicle includes activating a ducted fan.

41. The method of claim 39, wherein elevating the unmanned airborne vehicles includes activating a lighter-than-air vehicle.

42. The method of claim 39, wherein sensing the environmental conditions includes sensing the environmental conditions with at least one of:
- an acoustic sensor;
- an optical sensor;
- a television camera
- a nuclear, biological and chemical detector;
- an infrared sensor, and
- a Global Positioning System sensor.

43. The method of claim 39, wherein terminating the deployment includes retrieving the unmanned airborne vehicle.

44. The method of claim 43, wherein retrieving the unmanned airborne vehicle includes retrieving the unmanned airborne vehicle into a recess.

45. The method of claim 43, wherein retrieving the unmanned airborne vehicle includes retrieving the unmanned airborne vehicle into a basket.

46. The method of claim 39, wherein terminating the deployment includes releasing the unmanned airborne vehicle.

47. The method of claim 39, further comprising transmitting sensed data to a remote location.

48. The method of claim 39, further comprising remotely controlling the operation of the ground vehicle.

* * * * *